J. EMERY.
HARVESTER.

No. 66,135.   4 Sheets—Sheet 1.

Patented June 25, 1867.

J. EMERY.
HARVESTER.

No. 66,135.

4 Sheets—Sheet 3.

Patented June 25, 1867.

Witnesses.
R. T. Campbell

Inventor.
J. Emery
by
Mason, Fenwick & Lawrence

J. EMERY.
HARVESTER.
No. 66,135.
4 Sheets—Sheet 4.
Patented June 25, 1867.
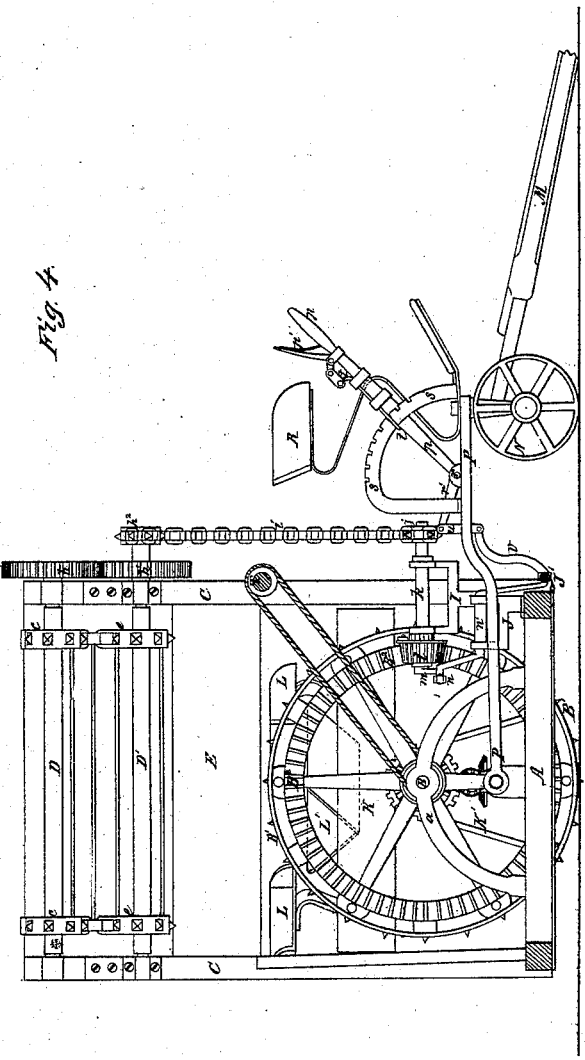

UNITED STATES PATENT OFFICE.

JONATHAN EMERY, OF CEDAR FALLS, IOWA.

IMPROVEMENT IN HARVESTERS.

Specification forming part of Letters Patent No. 66,135, dated June 25, 1867.

*To all whom it may concern:*

Be it known that I, JONATHAN EMERY, of Cedar Falls, in the county of Black Hawk and State of Iowa, have invented certain new and useful Improvements in Harvesting-Machines; and I do hereby declare that the following is a full, clear, and exact description thereof, reference being had to the accompanying drawings, making a part of this specification, in which—

Figure 1:
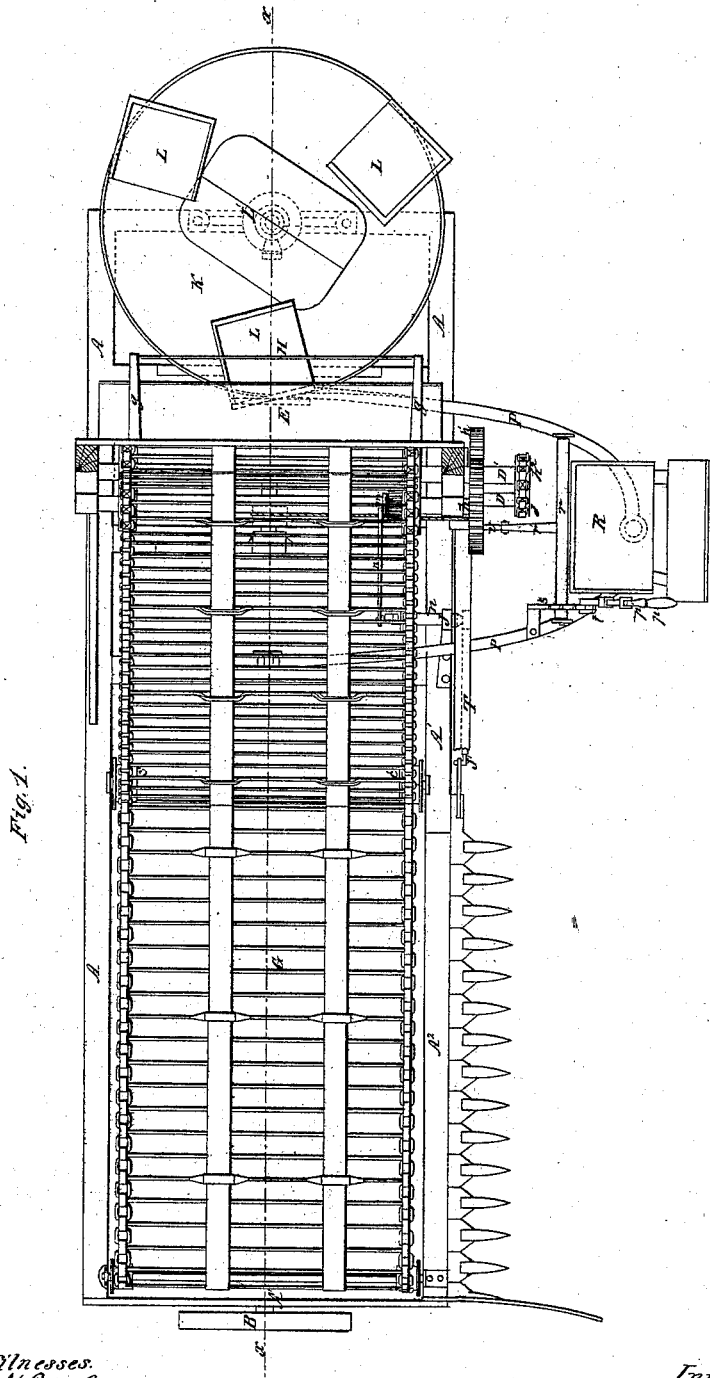
Figure 2:
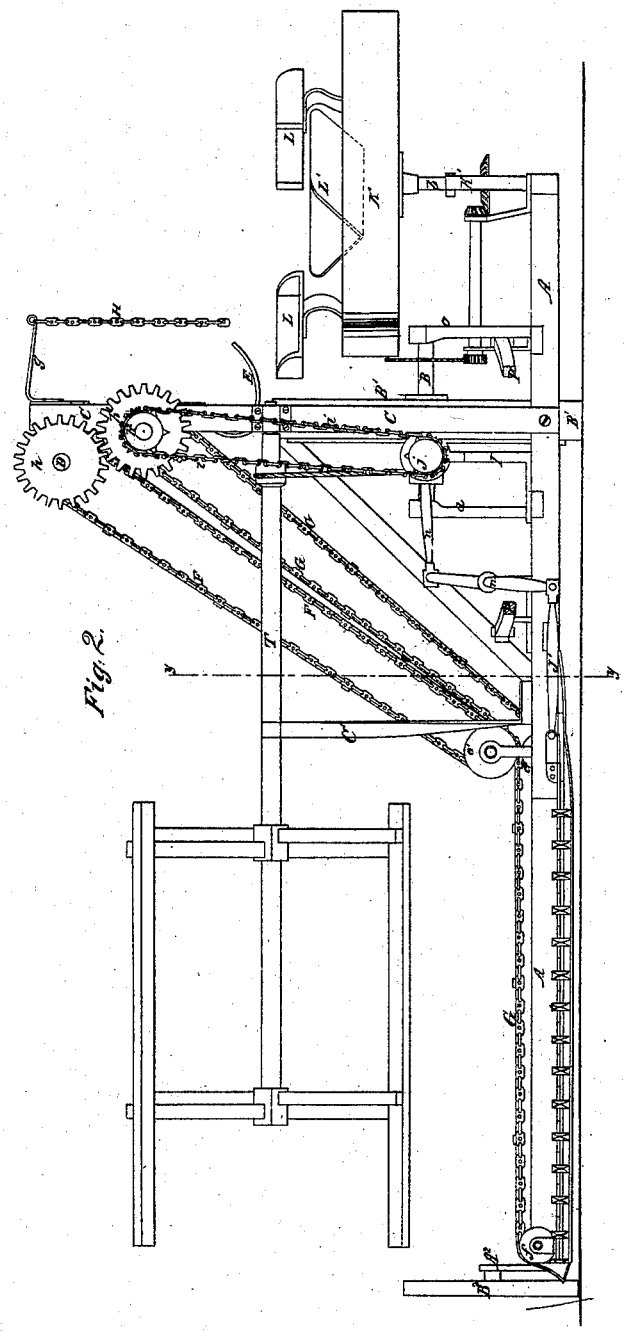
Figure 3:
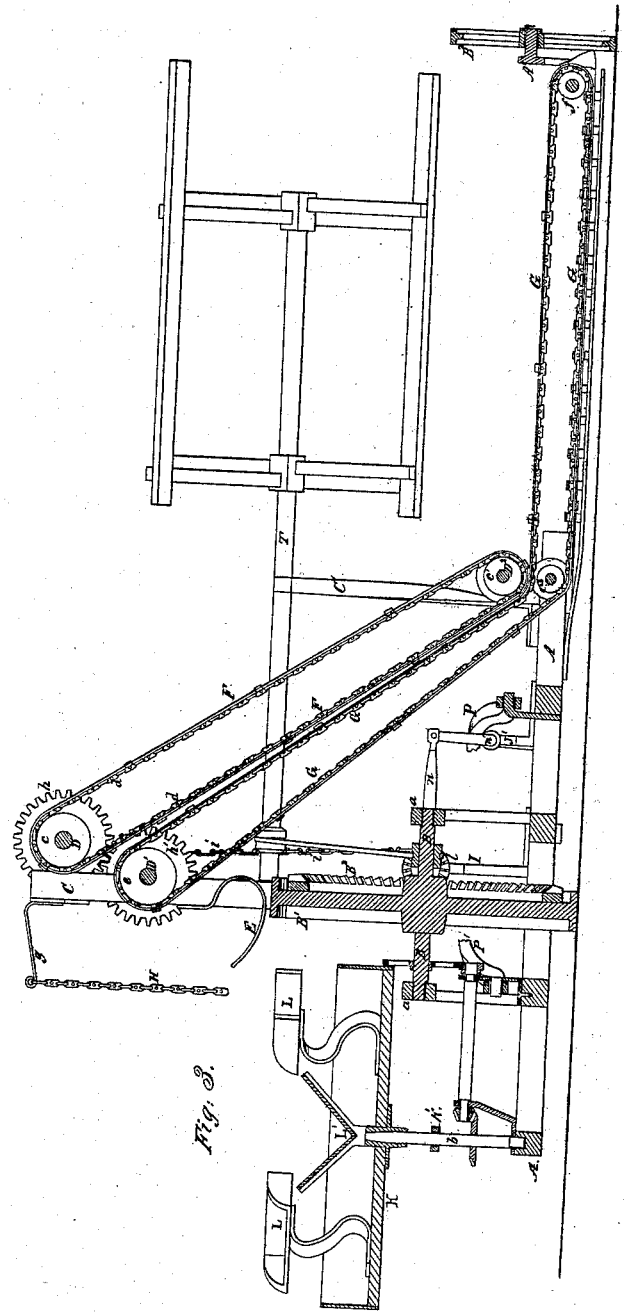

Figure 1, Sheet 1, is a plan view of the harvesting-machine. Fig. 2 is a front view of the same. Fig. 3, Sheet 2, is a vertical transverse section taken in the plane indicated by red line $x\ x$ in Fig. 1. Fig. 4 is a transverse section taken in the vertical plane indicated by red line $y\ y$ in Fig. 2.

Similar letters of reference indicate corresponding parts in the several figures.

This invention relates to certain novel improvements on that class of grain-harvesters wherein endless carriers are employed, and so arranged that the cut grain is moved from behind the cutting apparatus in a lateral direction, and then elevated and deposited into a receiver, from which latter the grain is taken, bound in gavels, and then thrown upon the ground.

The main object of my invention is to employ a rotary platform as the support for one or more binders, in conjunction with endless aprons or grain-carriers, which shall convey the grain, as fast as it is cut, from behind the sickle and deposit it into a receiver, said rotary platform being located on the inner side of the main driving-wheel, in such relation to said receiver that the binders will be moved around and brought alongside of the receiver, so that they can successively take a gavel therefrom and bind it, as will be hereinafter described.

The invention also has for its object communicating a reciprocating motion to the sickle from the main driving-wheel by means of rocking crank-shaft and pitman-rods, so arranged that the pitman which is attached to the sickle will be nearly in a horizontal plane therewith, notwithstanding the main frame of the machine is located some distance below the axle of said driving-wheel, as will be hereinafter described.

To enable others skilled in the art to understand my invention, I will describe its construction and operation.

In the accompanying drawings, A represents a rectangular frame, which is composed of longitudinal beams connected to transverse beams, and suspended beneath the axle B of the main driving-wheel B' by means of arched bearings $a\ a$. By this mode of hanging the draft-frame A it is brought very near the ground. The rear transverse beam of frame A is extended outward a suitable distance, and connects with a longitudinal arched piece, $A^1$, the forward end of which is rigidly bolted to the finger-bar $A^2$. This finger-bar is rigidly bolted to the bottom side of the outer end of the front beam of the frame A, as shown in the drawings. The outer ends of the frame A and finger-bar $A^2$ are supported by means of a small wheel, $B^2$, which turns upon an axle that projects from the arched piece $A^1$, which axle is in a vertical plane intersecting the axis of the main wheel $B^1$.

The frame A is nearly or quite balanced upon its supports, and its inner end projects inward from the wheel $B^1$ a sufficient distance to afford a support for the post $b$, upon which the circular platform is secured, as shown in Figs. 1, 2, and 3. In front and in rear of the main wheel $B^1$, posts C C are erected upon the front and rear beams of frame A, and properly braced thereto, so as to maintain a perpendicular position thereon. These posts C C sustain two shafts, D D$^1$, and also a concave grain-receiver, E, which latter is arranged below the lower shaft D$^1$, and projects out from the inner end of the machine just above the main driving-wheel $B^1$, as shown in Fig. 3. The shaft D has two spurred drums or rag-wheels, $c\ c$, upon it, which receive over them endless chains $d\ d$. These chains are connected together by rods arranged at suitable distances apart, so as to form an endless compressing-apron, F, the lower part of which passes around the drums $c^1$ on shaft D$^2$. The shaft D$^1$ is provided with spurred drums $e\ e$, over which the endless chains of a carrier, G, pass, which latter is constructed like the compressing-apron F, and carried downward and outward beneath the drums $c^1$, thence to the outer end of the machine, and passed around the drums $f\ f$. The upper part of the carrying-apron G passes beneath the apron on drums $c^1$ $c^1$, and the lower part of apron G passes beneath the drums $c^2$ $c^2$, which are located below drums $c^1$, as shown in Fig. 3. That part of the endless carrier G which is arranged behind the finger-bar $A^2$ receives upon it the falling grain, and moves the cut grain beneath the endless compressing-apron F, when the grain will be elevated between the two aprons and delivered into the receiver E. The grain is caused to fall into the receiver E, and prevented from scattering by means of a curtain, H, which is suspended from arms or brackets $g$ $g$, so as to hang freely, and give or yield between its upper and lower ends to the grain. On the front ends of the shafts D $D^1$, spur-wheels $h$ $h^1$ are keyed, which engage with each other. The shaft of spur-wheel $h^1$ carries on its front end a rag-wheel, $h^2$, over which a chain, $i$, passes, that extends downward and passes around a rag-wheel, $j$, on a short shaft, $k$. This shaft $k$ has its bearings upon a standard, I, and carries on its rear end a pinion spur-wheel, $l$, which engages with the teeth $B^2$ on spur-wheel $B^1$, and receives motion from this wheel when the machine is moved. The wheel $l$ is applied on its shaft $k$ by means of a ratchet and pawl, so that when the machine is backed this wheel will not turn its shaft. On the extreme rear end of the shaft $k$ a crank, $m$, is keyed, to which a pitman-rod, $n$, is applied. This pitman-rod gives a rocking motion to a shaft, $n'$, which has its bearings upon a standard, J, and which has two arms projecting from its ends. To the lower end of the front arm a pitman, J', is pivoted, which is also pivoted to the inner end of the sickle 2.

The turning-post $b$, upon which the circular platform K is mounted, is steadied by an arched brace, K', and rotated by means of the driving-wheels B', through the medium of spur-wheels, as shown clearly in Figs. 2 and 3. This platform has three binder's seats, L, applied to it, and arranged at equal distances apart, and in the center of this platform is a receptacle, L', for receiving a quantity of grain, of which the binders make their bands for binding the gavels.

The draft-pole M is attached to the axle of two carriage or guide wheels, N, which axle is pivoted by a king-pin to the front part of draft-arms P P, which are pivoted at their rear ends to standards arranged on both sides of the main wheel $B^1$.

The driver's seat R is mounted upon the forward connected portion of arms P, over the axle of wheels N, and on one side of this seat R a hand-lever, $p$, is arranged, which is secured to a transverse rock-shaft, $r$, upon arms P, from the center of which shaft a short arm, $r'$, projects backward, as shown in Fig. 4. On one side of vibrating lever $p$ is a notched sector, $s$, which is secured to arms P, and which receives in its notches a latch-plate, $t$, that secures the lever to it in any desired position. The latch-plate $t$ can be released from its sector $s$ at pleasure by grasping the handle on lever $p$ and moving the spring-key $p'$, when lever $p$ will be free to vibrate forward or backward. The rear end of arm $r'$ is connected by a link, $u$, to a curved bar, $v$, which is secured firmly to, and projects from, the front beam of frame A, as shown in Fig. 4. By this arrangement the driver can raise or lower the front part of the machine at pleasure while riding upon his seat, and by means of the latch-plate and the notched sector he can fix the cutting apparatus at any desired height.

The standing grain is gathered into the sickle by means of a rotary reel, the shaft T of which has its bearings in the front post C, and in a post, C'. This reel is driven by means of a belt passing over a pulley on the main axle B.

I do not confine my invention to any particular manner of constructing the endless grain-carrying aprons F and G, as these aprons may be made in various ways; nor do I confine myself to the particular mode shown in the drawings of communicating rotary motion to the binders' platform from the main axle B. The seats upon this platform may be secured fast, or applied so as to turn upon pivots, and there may be more or less than three seats used, as circumstances require.

Having thus described my invention, what I claim as new, and desire to secure by Letters Patent, is—

1. The flexible swinging curtain H, arranged in the relation to the binders' station, and to the endless conveyer G and endless compressing-apron F, substantially as and for the purpose set forth.

2. The rotating platform K, for supporting one or more binders, in combination with a receptacle, E, into which the cut grain is delivered, substantially as described.

3. The combination of the rotating binders' station, and the endless conveyer G, and endless compressing-apron F, substantially in the manner and for the purpose described.

4. The arrangement of the gears, chains, and cranks for operating the aprons F G and the sickle 2 directly from the main supporting-axle and wheel, B $B^1$ $B^2$, substantially as shown and described.

5. The arrangement of the pivots of the arms P P on each side of the driving-wheel $B^1$, and below the axle, in combination with the latch-lever $p$, rock-shaft $r$, arms $r'$ $v$, and link $u$, arranged and operating as described and shown.

6. A rotating binders' station, in combination with a harvester.

JONATHAN EMERY.

Witnesses:
E. W. JEWELL,
L. B. CROSBY.